United States Patent [19]

Malkani et al.

[11] Patent Number: 4,753,499
[45] Date of Patent: Jun. 28, 1988

[54] JOINING OF OPTICAL FIBRE CABLES

[75] Inventors: Prem G. Malkani, Pinner; Peter J. Clarke, Thatcham, both of England

[73] Assignee: British Telecommunications, London, England

[21] Appl. No.: 392,695

[22] Filed: Jun. 28, 1982

[30] Foreign Application Priority Data

Oct. 8, 1981 [GB] United Kingdom ............... 8130368

[51] Int. Cl.$^4$ ............... G02B 6/36; G02B 7/26
[52] U.S. Cl. ................... 350/96.20; 350/96.21
[58] Field of Search ............. 350/96.20, 96.23, 96.16, 350/96.21

[56] References Cited

U.S. PATENT DOCUMENTS 4,171,867 10/1979 Cocito .
4,252,405 2/1981 Oldham ........................... 350/96.23
4,359,262 11/1982 Dolan .............................. 350/96.20

OTHER PUBLICATIONS

Cos 2 Experiment in Turin: Field Test on an Optical Cable in Ducts; Cocito et al.; IEEE Transactions on Communications; vol. Com-26, No. 7; Jul. 1978; pp. 1028-1035.
IEEE Transactions on Communications, vol. Com-26, No. 7, Jul. 1978, pp. 1028-1035, IEEE, New York, USA G. Cocito et al., Cocito et al., "Cos 2 Experiment Cable in Ducts" p. 1031 left-hand column, line 13, p. 1032, left-hand column, line 7, FIG. 9.

Primary Examiner—William L. Sikes
Assistant Examiner—Robert E. Wise
Attorney, Agent, or Firm—Solon B. Kemon

[57] ABSTRACT

Optical fibre based cables 1 and 2 are jointed by fixing their axial strength members 3 to a perforated connecting member 9. Fibre tails to be joined are stored on the connecting member by winding around guides 16 engageable with perforations 11. Fibre end parts are joined and positioned in ferrules 24 also engaged with perforations 11.

9 Claims, 2 Drawing Sheets

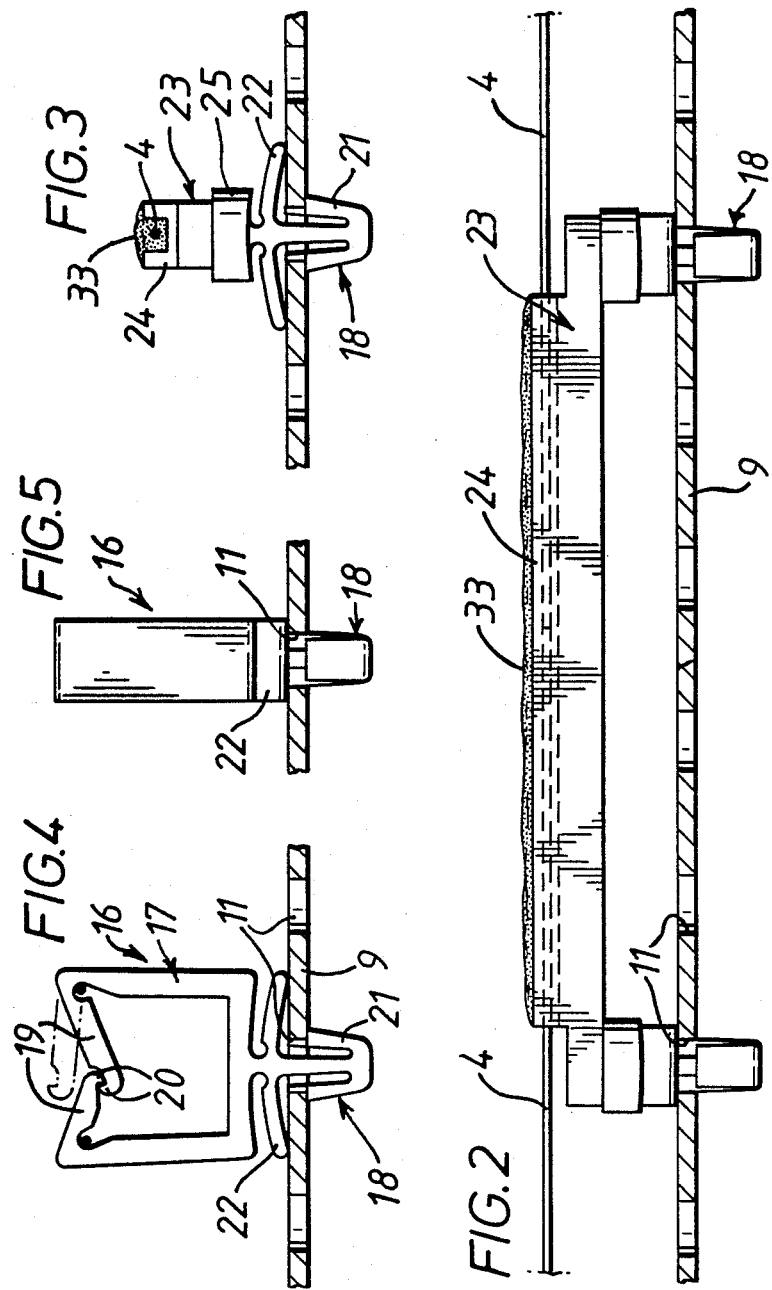

JOINING OF OPTICAL FIBRE CABLES

DESCRIPTION

This invention relates to the joining of cables based on optical fibres.

It is an objective of the present invention to provide a joining assembly for a cable based on optical fibres which enables exposed fibres to be joined at a location spaced from the juxtaposed cables and the resultant relatively long lengths of fibre to be stored after joining on the assembly without the bending of fibres beyond their minimum bend radius.

In accordance with the present invention there is provided a joining assembly for at least two cables each comprising an optical fibre and a strength member, such assembly comprising a connecting member, means for securing the strength members of the cables to the connecting member and guides for the fibres at least some of which are detachably securable to a selected one of a plurality of discrete locations, preferably on the connecting member.

In use the cables are initially secured together by fixing the strength members of each cable to the connecting member with the desired length of fibre exposed as an elongate fibre tail. The fibre tails are spliced together by a suitable device and the excess length of fibre constituted by the joined and spliced tails is accommodated by winding around the guide members which can be appropriately positioned to suit the length of fibre at selected locations on the connecting member. The guide members will be so disposed that the fibre is not bent beyond the minimum bend radius.

In an embodiment a rigid, for example metal, connecting member has a flat region uniformly perforated to provide the discrete locations. The guide members have stems for insertion into and engagement with the perforations and parts around or through which the fibre tails are led. The exposed fibre ends are fixed together and secured in a carrier also having one or more stems for selective positioning on the perforated flat region. This positioning is also chosen to avoid detrimental bending of the fibre.

The cable with which the invention is primarily concerned is intended for inland use and comprises a central axially extending strength member, usually of wire strands, a plurality of optical fibres each sheathed in plastics surrounding the strength member and an outer protective casing. Other elements or layers for example electric conductors can be included.

With the embodiment set out above the central strength member is fixed to the rigid connecting member and the electrical conductors pass under the flat region for interconnection.

The invention further provides a completed joint with two of the cables joined by the assembly set out above, the assembly and joined cables being surrounded by a protective outer casing. The connecting member can extend diametrically across the interior of a cylindrical casing, conveniently with a transparent wall portion so that the orientation and condition of the joint can be visually monitored.

A particular embodiment of the invention will now be described by way of example and with reference to the accompanying drawings wherein:

FIG. 2 is a detail on a larger scale showing the joining of fibre ends;

FIG. 3 is an end view of the detail of FIG. 2, and

FIGS. 4 and 5 are further details showing guide members engaged with a perforated support.

Figure 1:
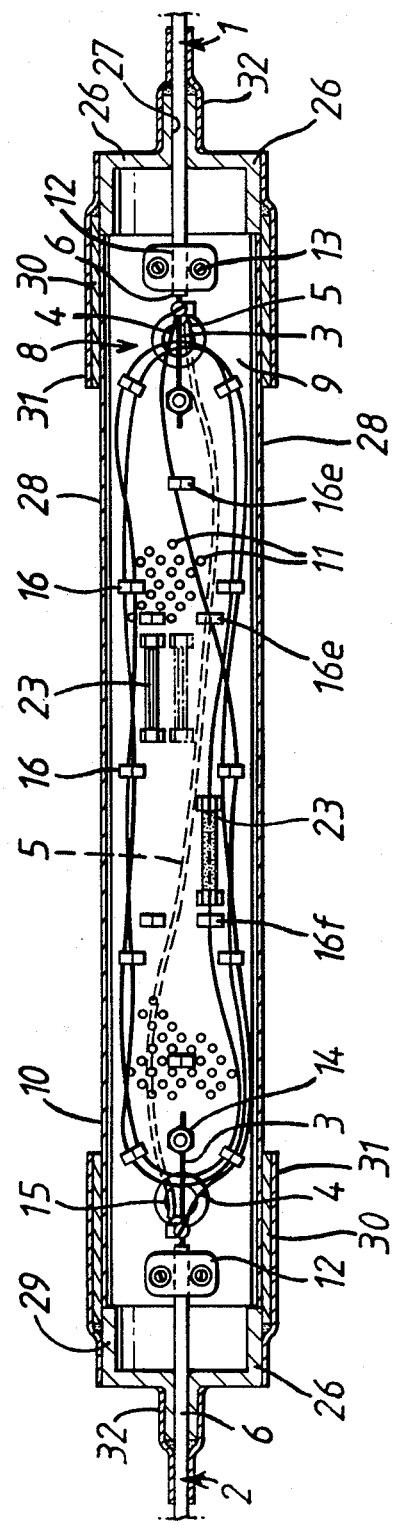
FIG. 1 is a sectional view through an optical fibre connection in a cased jointing assembly.

Referring initially to FIG. 1 of the drawings cables 1 and 2 to be joined each comprise a central strength member 3 constituted by wire strands, termed a king wire and a plurality of optical fibres 4 (one fibre only is illustrated for each cable) surrounding the king wire 3 and an electrical conducting wire 5 (with an insulating cover). Each cable further comprises an outer plastics cover 6. Each optical fibre is contained within a fitting plastics sheath.

A connecting assembly for joining together the cables 1 and 2 comprises an elongated shallowchannel shaped metal member 8 with a flat web 9 and shallow side flanges or rims 10. The member 8 is formed of sheet material perforated over the entire area (except for the end parts) with round holes 11 (some only shown in FIG. 1). Each hole has a diameter of approximately 0.5 centimeter, the periphery of each hole 11 being separated from the peripheries of adjacent holes by approximately 0.3 centimeter. At each end of the connecting member 8 there is positioned a clamp 12 for the cable outer cover. Each clamp 12 comprises an upper and lower member held together by screws 13 passing through web 9 to be engaged by nuts and having U-shaped recesses so as to define together a cylindrical clamping bore dimensioned to recieve the cover. Longitudinally inwardly with respect to each clamp 12 is a bolt 14 having an apertured stem through which the king wire 3 is inserted. A nut on the underside of the plate engages the bolt 14 thereby firmly to clamp the king wire against the upper surface of web 9. This fixing of each king wire transmits the principal axial stresses from the cable to and through the connecting member 8. Between the bolt and the cable clamp is a rubber or plastics lined bore 15 through which emerging conductor wire 5 can pass and traverse along the underside of the web 9.

A plurality of optical fibre guides 16 are detachably engaged with the web 9. These guides 16 will be described with reference to FIGS. 4 and 5 of the accompanying drawings. Each guide 16 is formed of a relatively stiff and strong self-supporting plastics material such as a polyamide resin and has a frame member 17 through which the fibre is passed and a dependant stem 18. The frame member is of generally rectangular configuration with the upper wall defined by first and second members 19 hingedly connected to the upstanding frame side members, the end parts of members 19 having interengaging hooks 20. The dot and pick lines show the hinged members 19 in the open position at which an optical fibre can readily be inserted into the frame. On depressing the hinged member 19 to the position shown in solid line the frame is closed by interengagement of the hooks 20. The stem 18 has barbs 21 and above the barbs outwardly extending arms 22. The barbs are inserted through the selected perforation 11 expanding laterally outwardly to prevent withdrawal of the stem 18, location against upward movement being provided by the arms 22.

Referring now to FIGS. 2 and 3 ferrules 23 for carrying spliced fibre tails are provided. Each ferrule 23 has a short trough 24 of channel section extending between supports 25 having lower parts similar to those of guides 16 and identified on the drawings with corresponding reference numerals. These supports 25 are so spaced that the ferrules 23 can be selectively positioned on web 9.

The protective housing for the completed joint comprises two end caps 26 with axial sockets 27 to receive entering cables 1 and 2. A rigid cylindrical and transparent tube 28 extends between inwardly extending rims 29 of caps 26. The web 9 extends diametrically across tube 28 and is located by its tight fit with, if desired, protrusions from the web fitting into slots in rims 29. A sealing sleeve 30 at each end bridges tube 29 and cap 26. Two bands 31, 32 of shrinkdown sleeving are provided at each end to connect the tube 28 to the cap 26 and the cap 26 to the incoming cable respectively. If the joint is to be pressurised then an air valve may be fitted in one of the caps 26, thus allowing the valve to be better protected than if it were fitted in tube 29. Additionally the valve may be fitted into a cap 26 during manufacture rather than in the field, thereby allowing a higher quality standard to be maintained.

To remove the tube 28 for joint maintenance the band 31 of heat shrinkable material between collar cap and the sleeve 30 is heated and slit with a sharp knife. The band may then be removed and the sleeve 30 slid to one side. As any air valve is located in a collar 26 the risk of damage to the valve is reduced during maintenance. After maintenance the joint may be readily resealed by sliding the sleeve 30 back over the collar 26 and a longitudinally slit sleeve of heat shrinkable material used to replace the original band 31.

The connecting assembly will be further described by reference to a typical splicing operation.

By way of introduction it should be explained that the end to end splicing of optical fibres is a difficult operation and may require several attempts. The splicing is carried out on a machine which has to be located at a position reasonably remote from the cable end. Thus a substantial length of fibre needs to be unsheathed from the cable prior to the splicing operation.

Thus a fibre tail, that is a fibre with its individual sheath, is exposed by cutting away the outer cover 6. The king wires 3 are then fixed as described above and the outer covers of the cables secured by clamps 12. The two fibre tails to be joined are taken to the splicing machine. The individual sheaths are stripped off the tail end parts and the fibre ends spliced together and placed in the channel shaped trough 24 of a ferrule 25 and fixed there with a mass 33 of settable resin (see FIGS. 2 and 3). A suitable number of the guide members 16 are then positioned as a trackway around the periphery of perforated web 9 and spare fibre ends wound around it. Entry guide 16e leads one of the fibres 4 into the peripheral track way and a guide 16f leads one of the fibres 4 to the suitably positioned ferrule 23. It will be appreciated that the user, having guide members 16 and the ferrules 23 selectively engageable with the web at any desired position can store the fibre on the connecting member and secure it thereto without exceeding the minimum bend radius dictated by the fibre. At an appropriate stage of the operation the electric conductors are led underneath the plate 5 and joined. The external housing is then applied.

Other embodiments are specifically envisaged. A perforated cylinder would provide a large area surface for receiving guides and ferrules. Alternatively several flat perforated plates could be assembled into an array polygonal in cross section. In these embodiments the fixing of the cable strength members will probably not be made on the perforated member.

We claim:

1. A joint between two optical fibre based cables each comprising an optical fibre, usually sheathed, within an outer cover, the fibres projecting for splicing as elongated tails, such joint also comprising a connecting member having a plurality of perforations, clamps on the connecting member gripping the cables by the outer covers with the tails extending over the connecting member and being spliced together and a plurality of guides each having a stem for detachable engagement with a perforation on the connecting member detachably connected each to a location on the connecting member, the elongate tails being wound after splicing around the guides for storage on the connecting member, appropriately positioned to accommodate the length of the fibre after splicing wth the minimum bend radius of the fibre not being exceeded.

2. A joint according to claim 1 wherein strength members of the cables are secured to the connecting member.

3. A joint according to claim 2 wherein the connecting member comprises an elongated flat rigid member having securing means for the strength members adjacent either end.

4. A joint as claimed in claim 3 wherein the said member is disposed diametrically within a generally cylindrical casing having a transparent wall part.

5. A joint according to claim 1 including carriers for joined fibre end parts said carriers also being detachably securable to a selected one of a plurality of locations.

6. A joint as claimed in claim 5 wherein each carrier comprises a channel to receive joined fibre end parts extending between stems for detachable engagement with a perforated support structure.

7. A joint as claimed in claim 1 wherein each guide comprises an openable frame through which a fibre passes.

8. A joint as defined by claim 7 wherein said frame is rendered openable by means of a hinge resiliently biased to the closed position.

9. A method of forming a joint between optical fibre based cables each comprising a cover and at least one optical fibre such method comprising the steps of:
   detaching elongated fibre tails from the cables to be joined;
   clamping the cables by the outer covers to a perforated connecting member with the fibre tails extending,
   splicing the fibre tails at a location remote from said connecting member,
   applying to the perforated surface of said connecting member a selected number of guides each having a stem in detachable engagement with a perforation of the surface, the number and location of the guides being chosen so as to provide a guide track for the excess length of joined fibre,
   and winding the said excess length around the guide in a stored configuration without exceeding the minimum end radius of the fibre.

* * * * *